2,859,436

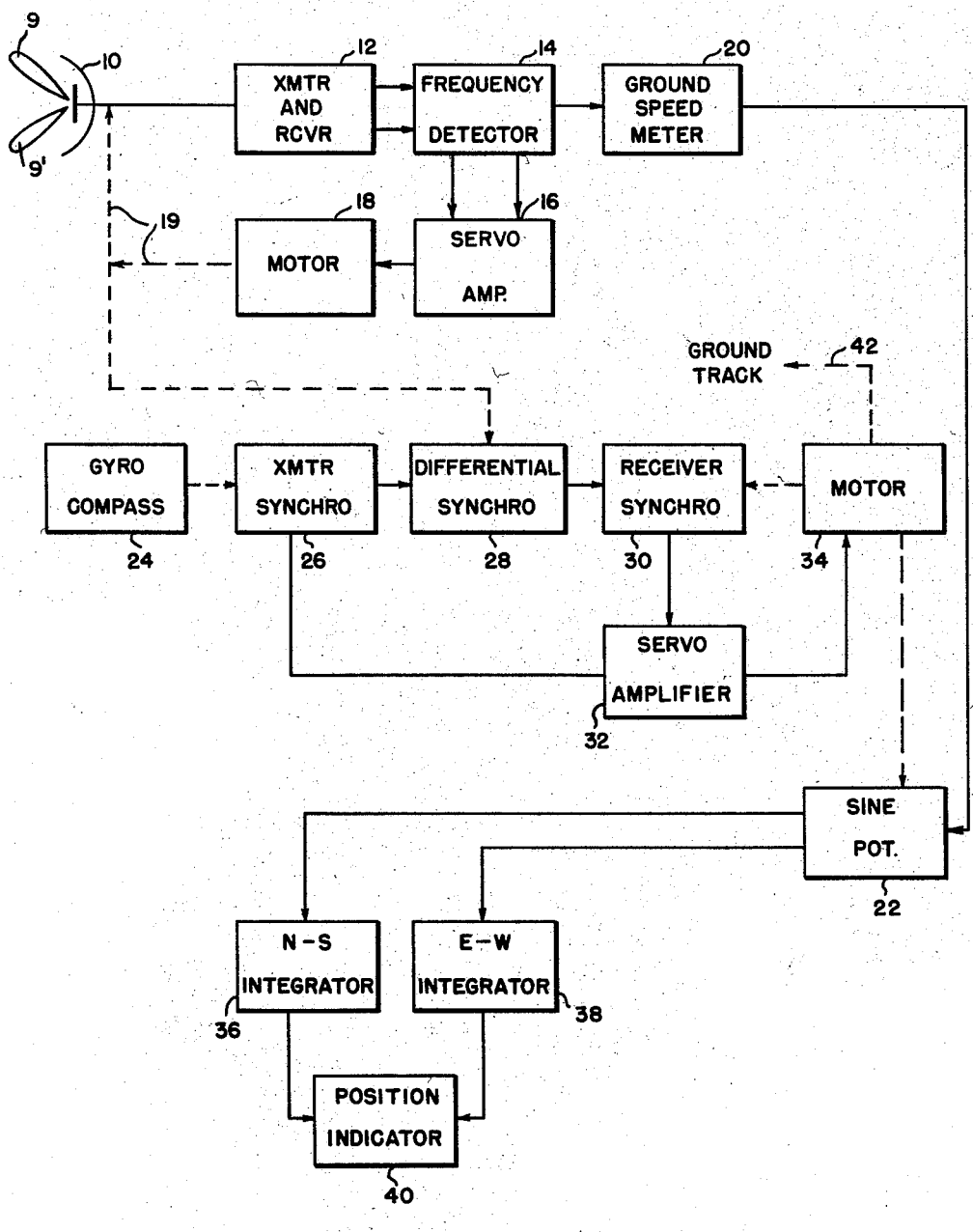

SELF-CONTAINED RADIO NAVIGATION SYSTEM

William J. Tull, White Plains, N. Y., assignor, by mesne assignments, to the United States of America as represented by the Secretary of War Application March 4, 1946, Serial No. 651,925

3 Claims. (Cl. 343—9)

This invention relates to electrical apparatus and more particularly to automatic radio navigation systems.

Navigation of an aircraft in flight is usually difficult when the pilot or navigator of the aircraft in flight is unable to see the ground and establish check points or is unable, because of clouds or other obstruction, to plot the course of the aircraft by celestial navigation. Radio guide beams have been established along heavily travelled air routes and equipment has been installed at many of the major airports to aid the pilot of an aircraft in determining and maintaining his course. Such systems are obviously limited in the range that they cover and are also limited by the fact that they are not under the complete control of the pilot of the aircraft. The ideal navigation system for an aircraft would be one that could be carried in the aircraft and be completely independent of all ground stations. The equipment should give the pilot of the aircraft continuous accurate information in easily readable form as to his position with respect to the ground. The system should instantly take into account changes in the drift and gound speed of the aircraft as well as changes in direction introduced by the pilot. Further requirements of the ideal system are that a minimum of weight be added to the aircraft which would imply that the system should also be as nearly automatic as possible so that an operator for the system need not be carried in the aircraft.

It is an object of this invention therefore to provide an automatic navigation system for aircraft in flight.

Another object of this invention is to provide a navigation system that is completely under the control of the pilot of the aircraft and completely independent of ground stations.

A still further object of this invention is to provide a navigation system that instantly corrects for change in ground speed and drift and changes in heading of an aircraft.

For a better understanding of the invention together with other and further objects thereof reference is had to the following description taken in connection with the accompanying drawing which is a schematic drawing in block form of the present invention.

In the drawing, an antenna 10 is shown connected to a transmitter and receiver component 12. Component 12 in this embodiment of the invention is a radar or radio object locating system, several types of which are well known in the art. As an example of the circuits that may be included in component 12 the radar system may include a pulse type oscillator for generating short duration high frequency exploratory pulses. A receiver may also be provided to detect and amplify object returned echoes resulting from the reflection of the exploratory pulses by objects within the beam of energy radiated from antenna 10. The output of the receiver which in this embodiment is also the output of component 12 is a series of video signals corresponding to object returned echoes. These signals are amplitude modulated in a manner to be described later.

The output of component 12 is applied to a frequency detector 14. Detector 14 provides two outputs. The first output is a signal applied to a servo amplifier 16 which is electrically connected to a motor 18. Motor 18 is mechanically connected to antenna 10 in such a manner that motor 18 rotates antenna 10 in azimuth when the motor 18 is energized by servo amplifier 16. This mechanical connection is denoted by the dashed line 19 connecting motor 18 and antenna 10. The signal supplied by detector 14 to amplifier 16 has a distinguishable characteristic according to the frequency of amplitude modulation of the signals from component 12.

Detector 14 is also electrically connected to a ground speed meter 20. Meter 20 includes circuits which produce a signal that is proportional in amplitude to the frequency of the signal supplied to it by detector 14. This signal may be applied to an indicating meter (not shown) if desired and is connected to a sine-wound potentiometer 22.

A gyro compass 24 is mechanically connected to a transmitting synchro 26, that is, a device for transmitting angular information to a point remote therefrom. The mechanical connection between these two units is denoted by the dashed line connecting the units. The terms gyro compass and synchro are used in an illustrative sense only and are not intended to limit this invention to these particular types of units. Gyro compass 24 may be any type of unit that will provide fixed azimuth reference direction regardless of the movement of the vehicle in which it is mounted. Synchro 26 and other similar units to be described presently may be a Selsyn, a suitably connected potentiometer or any other convenient data transmitting device. Many such devices are well known in the art and, therefore, the synchro data transmitting system shown will serve to illustrate all similar systems.

Synchro 26 is electrically connected to a differential synchro 28 which is mechanically connected to antenna 10 and electrically connected to a receiving synchro 30, that is, a device which receives the transmitted angular information. The output of synchro 30 is connected to a servo amplifier 32 which has an output that is electrically connected to a motor 34. The servo amplifier 32 is connected to the synchro 26 for purposes of establishing a reference signal. In some types of data transmitting systems this connection is unnecessary and may be omitted. The stators of synchros 26, 28 and 30 are fixed in position relative to the aircraft. Motor 34 is mechanically connected to receiver synchro 30 and sine potentiometer 22. A first and a second output from potentiometer 22 are connected to a north-south integrator 36 and an east-west integrator 38 respectively. The integrators 36 and 38 may be any devices well known in the art, such as variable speed motors connected to suitable helical potentiometers, capable of providing intelligence which is a function of the time integral of the input signal. The outputs of integrators 36 and 38 are electrically connected to a position indicator 40 which may be any device such as a cathode ray tube for giving visual indication to the output of the integrators. An output 42 from motor 34 may be connected, if desired, to a ground track direction indicator (not shown).

It may be desirable under some circumstances to transmit two beams 9, 9' from antenna 10 displaced at some small angle and then position antenna 10 so that the frequency of modulation of the two beams are equal although not necesarily a minimum. This method of positioning antenna 10 differs only in detail from the one already described above and it will be obvious to those skilled in the art that both methods of positioning fall within the scope of the invention. As is well known in such systems the signals from the individual beams are derived separately for the purpose of comparing the frequencies thereof. As hereinbefore set forth, when the antenna 10 is directed along the ground track the frequency of modulation of the energy received along beams 9, 9' will be equal. For orientations of the center line of antenna 10 on one side of the ground track, the frequency of modulation of the signal received along beam 9 will be higher than that of beam 9'. With the antenna 10 having its center line oriented on the other side of the ground track the frequency of modulation of the signal received along beam 9 will be lower than that of beam 9'. Thus, the sense of the deviation in orientation of the antenna 10 with respect to the ground track will be reflected by the relative modulation frequency in the two signal channels. The recovery of the modulation envelopes by the frequency detector 14 permits the amplification thereof in the amplifier 16. Since the motor 18 is to maintain the frequencies of these signals equal, the rotation thereof is controlled differentially in accordance with the detected modulation frequencies.

In other embodiments of the invention it may be desirable to employ as component 12 a moving target radio-object locating system to determine the ground track and ground speed of the aircraft. An example of a preferred type of moving object locating system is disclosed in the copending application of Robert H. Dicke, Serial No. 590,052, filed April 24, 1945, now Patent No. 2,535,274. In such a system returning echo signals are combined with a signal having a fixed phase relationship with respect to the transmitted pulses. Objects moving with respect to the radio object locating system will manifest themselves by echo signals having a cyclic variation in amplitude. The frequency of modulation of these echo pulses will be directly proportional to the relative speed of the system with respect to the reflecting objects. In this application where the radio system is airborne, considering only stationary objects, those objects laying along the ground track will result in signals having the maximum frequency of modulation and the frequency of modulation of signals resulting from objects lying along a line making an angle with the ground track will be equal to this maximum frequency multiplied by the cosine of the angle between the line of position and the ground track.

Ground speed meter 20 provides an output signal that is proportional in amplitude to the ground speed of the aircraft. The signal from meter 20 is applied to sine potentiometer 22 the contacts of which are positioned in accordance with the direction of the ground track of the aircraft. A sine potentiometer is one which is designed to have a sinusoidal output characteristic. The positioning of potentiometer 22 is accomplished in the following manner. Gyro compass 24 establishes an azimuth reference line preferably a true north line and mechanically positions the rotor of transmitter synchro 26 in accordance with this azimuth reference line. With antenna 10 pointed along the major axis of the aircraft differential synchro 28 has no effect, therefore, receiver synchro 30 is positioned in accordance with the signal from synchro 26. The output of synchro 30 supplies a signal to servo amplifier 32 which causes this amplifier to supply an operating potential to motor 34 until the rotor of synchro 30 is positioned in accordance with the rotor of synchro 26. In this position the rotor of synchro 30 will be displaced from its zero position by an angle equal to the azimuthal heading of the aircraft. Motor 34 also positions the movable element of the sine potentiometer 22 in accordance with the heading of the aircraft. When drift is present the axis of antenna 10 is positioned in the direction of the ground track of the aircraft as described above and the rotor of synchro 28 is displaced from its zero position by an angle equal to the angle between the heading of the aircraft and the direction of the ground track. This angle is by definition the drift angle. Motor 34 will now position the rotor of synchro 30 to a position determined jointly by synchros 26 and 28. Therefore, the rotor of synchro 30 and the contacts of potentiometer 22 are positioned in accordance with the actual direction of the ground track of the aircraft. Stated mathematically, $\theta_{30}=\theta_{26}+\theta_{28}$ where $\theta_{26}$ is the angular position of the rotor of synchro 26 with respect to the stator of this synchro, $\theta_{28}$ is the angular portion of the rotor of synchro 28 with respect to the stator of this synchro and $\theta_{30}$ is the angular position of the rotor of synchro 30 with respect to stator of this synchro. Since the positioning of antenna 10 and the contacts of potentiometer 22 is controlled automatically by the two servo loops, the contacts of potentiometer 22 will assume a position corresponding to the new direction of the ground track whenever the heading of the aircraft or the drift angle changes. This operation is for all practical purposes instantaneous and is fully automatic.

The signal from meter 20 is divided into two components in potentiometer 22. One component, the north-south component of velocity is equal to the ground speed of the aircraft multiplied by the cosine of the angle with respect to north of the ground track of the aircraft. The other component of velocity, the east-west component, is equal to the ground speed multiplied by the sine of the same angle. The connection of a sine potentiometer to perform this function is well known in the art.

The two signals from potentiometer 22 are applied to integrators 36 and 38 respectively where the signals are integrated over any desired time interval. This time interval may be several minutes or several hours if desired. The outputs of integrators 36 and 38 are applied to a position indicator 40 which registers the displacement of the aircraft in miles, yards or any other convenient unit of measure in a north-south and an east-west direction from any selected reference point. Many various types of indicators may be employed to display this data. One suggested type of indicator is a cathode ray tube in which the horizontal position of the spot is indicative to the east-west displacement of the aircraft and the vertical position of the spot is indicative of the north-south displacement of the aircraft. Auxiliary controls may be provided to set in initial displacement of the spot. If desired a transparent map overlap may be placed over the screen of the cathode ray tube and the position of the spot on the map would instantly and continuously indicate the position of the aircraft with respect to the ground.

From the above description of the invention it can be seen that ground speed data may be obtained from meter 20; ground track direction data from motor 34, synchro 30 or potentiometer 22, north-south and east-west velocities from potentiometer 22, north-south and east-west displacements from integrators 36 and 38, aircraft heading from compass 24 or synchro 26; and drift angle from antenna 10 or synchro 28.

In this invention, the output of integrators 36 and 38 are displayed on an indicator 40. However, the invention is not limited to this application alone. The wide range of data provided together with the fully automatic operation of the invention makes the invention applicable to automatic aircraft control and a wide variety of other uses besides the use as an automatic navigation system.

Therefore while there has been described what is at present considered the preferred embodiment of the invention, it will be obvious to those skilled in the art that various changes and modifications may be made therein without departing from the invention.

What is claimed is:

1. A self-contained radio navigation system for use in an aircraft comprising a positionable antenna having two directional beams symmetrically disposed with respect to the axis of orientation for illuminating the earth beneath the aircraft to be navigated by said system, radio means associated with said antenna for transmitting exploratory pulses and receiving ground returned echoes, means for measuring the frequency of the amplitude modulation of said ground returned echoes for each said beam, means associated with said frequency measuring means for positioning said antenna in response to the output of said frequency measuring means until the frequencies of modulation for the beams are equal, means associated with said frequency measuring means for determining the ground speed of the aircraft, means for establishing a fixed azimuth reference direction, means for determining the heading of said aircraft with respect to said reference direction, means associated with said antenna and said positioning means for determining the drift angle of said aircraft, means for combining said heading and said drift angle to obtain the direction of the ground track of said aircraft, signal proportioning means, means for positioning said proportioning means in response to the output of said combining means in accordance with said determined ground track, means for applying a signal to said proportioning means that is proportional to the ground speed of said aircraft, said proportioning means providing a first output signal proportional to the ground speed times the sine of the angle between the ground track of the aircraft and said fixed azimuth reference directions and providing a second output signal proportional to the ground speed of said aircraft times the cosine of the angle between the ground track and said reference direction, a first and a second integrator circuit for individually integrating said first and said second signal respectively from said proportioning means whereby signals are obtained that are proportional to the displacement of said aircraft in two directions from a selected reference point and means for displaying the displacement data from said two integrator circuits on a suitable indicator.

2. A self-contained radio navigation system for use in an aircraft comprising an antenna for right-left sensing and positionable about an axis of orientation for illuminating the earth beneath the aircraft to be navigated by said system, means for determining the heading of the aircraft relative to a reference direction, means for determining the drift angle of said aircraft including means for maintaining said axis in a predetermined position relative to the ground track of said aircraft, means responsive to ground signals received by said antenna for determining the ground speed of the aircraft, means for automatically combining data from said heading means and said drift angle means to obtain the direction of the ground track of the aircraft, means for resolving data from said ground speed means in accordance with the direction relative to said reference of the ground track of the aircraft to obtain two components of ground velocity in mutually perpendicular directions, means for integrating said two components of velocity over a selected time period to obtain two components of displacement data at right angles, and means for utilizing said displacement data.

3. A self-contained radio echo navigation system comprising means on said aircraft for determining a reference direction, radio signal transmitter and radio echo signal receiver means for comparing the relative Doppler effect of ground echo signals to determine the direction relative to said reference of the ground track of the aircraft carrying said system, means responsive to received ground echo signals for determining the ground speed of said aircraft, and means responsive to signals representative of said direction of the ground track of the aircraft and said ground speed of the aircraft for determining the displacement of the aircraft with respect to a selected reference point.

References Cited in the file of this patent

UNITED STATES PATENTS

| | | |
|---|---|---|
| 2,018,357 | Hammond | Oct. 22, 1935 |
| 2,058,306 | Fowler | Oct. 20, 1936 |
| 2,080,186 | Reymond | May 11, 1937 |
| 2,163,746 | Suffit et al. | June 27, 1939 |
| 2,183,634 | Zworykin | Dec. 19, 1939 |
| 2,223,224 | Newhouse | Nov. 26, 1940 |
| 2,391,554 | De Forest | Dec. 25, 1945 |
| 2,422,025 | Luck | June 10, 1947 |
| 2,444,171 | Sanders | June 29, 1948 |
| 2,499,228 | Norden | Feb. 28, 1950 |